United States Patent
Fries et al.

(10) Patent No.: US 7,698,318 B2
(45) Date of Patent: Apr. 13, 2010

(54) AUTOMATICALLY DETERMINING FILE REPLICATION MECHANISMS

(75) Inventors: Robert M. Fries, Redmond, WA (US); Vinay S. Badami, Hyderabad (IN); Michael L. Michael, Redmond, WA (US); Shiraz M. Somji, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 325 days.

(21) Appl. No.: 11/351,547

(22) Filed: Feb. 10, 2006

(65) Prior Publication Data

US 2007/0192386 A1   Aug. 16, 2007

(51) Int. Cl.
G06F 7/00 (2006.01)
G06F 17/00 (2006.01)

(52) U.S. Cl. .................. 707/610; 707/633; 707/637; 707/638

(58) Field of Classification Search ........................ None
See application file for complete search history.

(56) References Cited

U.S. PATENT DOCUMENTS

| | | | |
|---|---|---|---|
| 6,625,623 B1 | 9/2003 | Midgley et al. | |
| 6,704,755 B2 | 3/2004 | Midgley et al. | |
| 6,804,755 B2 | 10/2004 | Selkirk et al. | |
| 6,857,053 B2 * | 2/2005 | Bolik et al. | 711/162 |
| 6,898,600 B2 * | 5/2005 | Fruchtman et al. | 707/10 |
| 6,931,422 B1 * | 8/2005 | Gusler et al. | 707/204 |
| 7,007,144 B2 | 2/2006 | Nakanishi et al. | 711/162 |
| 7,159,081 B2 * | 1/2007 | Suzuki | 711/154 |
| 2002/0065835 A1 * | 5/2002 | Fujisaki | 707/200 |
| 2002/0147734 A1 * | 10/2002 | Shoup et al. | 707/200 |
| 2002/0156542 A1 * | 10/2002 | Nandi | 700/30 |
| 2004/0107199 A1 * | 6/2004 | Dalrymple et al. | 707/100 |
| 2005/0033757 A1 * | 2/2005 | Greenblatt et al. | 707/100 |

(Continued)

FOREIGN PATENT DOCUMENTS

KR   1020040108766   12/2004

(Continued)

OTHER PUBLICATIONS

Sivasubramanian, S., Pierre, G., and Van Steen, M., 2003. A case for dynamic selection of replication and caching strategies. In Proc. 8th Web Caching Workshop (Hawthorne, NY).*

(Continued)

*Primary Examiner*—Cheyne D Ly
*Assistant Examiner*—Jay A Morrison
(74) *Attorney, Agent, or Firm*—Workman Nydegger

(57) ABSTRACT

A backup administrator can backup files from a production server on any of a plurality of different bases. In particular, some files can be replicated on a changed-byte basis. In other cases, files can be backed up by replicating updated copies of the entire file, or even byte blocks of the file. Determinations as to how a replication agent will back up a certain file or set of files can be made by a backup administrator, automatically through a predefined logic, or dynamically based on defined criteria. Corresponding agents at the production server can then flag these files as indicated. Thus, at a later point, when the DPM server requests the updates of each file, the production server can either send over copies of the changed file bytes, entire copies of the changed file itself, or even changed blocks of a file, as appropriate.

20 Claims, 3 Drawing Sheets

U.S. PATENT DOCUMENTS

2005/0160118 A1* 7/2005 Berkowitz et al. .......... 707/204
2005/0192985 A1* 9/2005 Tsuchiya .................... 707/100
2005/0203908 A1* 9/2005 Lam et al. ..................... 707/10
2007/0022087 A1* 1/2007 Bahar et al. ................... 707/1

OTHER PUBLICATIONS

"Replication techniques for speeding up parallel applications on distributed systems", by Bal et al., Concurrency Practice and Experience. vol. 4, No. 5, pp. 337-355. 1992.*

* cited by examiner

AUTOMATICALLY DETERMINING FILE REPLICATION MECHANISMS

CROSS-REFERENCE TO RELATED APPLICATIONS

N/A

BACKGROUND

Background and Relevant Art

As computerized systems have increased in popularity, so have the needs to store and backup electronic files and other communications created by the users and applications associated therewith. In general, computer systems and related devices create files for a variety of reasons, such as in the general case of creating a word processing document in a work setting, as well as creating a file used for more sophisticated database purposes. In addition, many of these documents can include valuable work product, or sensitive information that should be protected.

One will appreciate, therefore, that there are a variety of reasons why an organization will want to backup electronic files on a regular basis, and thereby create a reliable restoration of an originally created file when needed. Generally, some of the challenges facing organizations implementing one or more such backup solutions relate to choices in a particular replication mechanism. That is, there are many ways (i.e., replication mechanisms) to copy data to be protected from a production server volume to a backup storage volume at a backup server, which is where the protected data would reside for recovery purposes. One can appreciate that each replication mechanism carries with it certain advantages and disadvantages.

For example, one conventional replication mechanism involves the production server logging the names of files that have changed on a volume to be protected, and then sending the entire, updated files to a backup volume at the backup server that corresponds to the volume to be protected at the production server. Another, similar mechanism for doing this is for the production server to not only log the name(s) of file(s) that have changed, but also compare the file(s) that have changed at the production server with any corresponding backup copy(ies) of the file(s) at the backup server, and then send to the backup server only the differential, changed bytes.

In particular, the latter mechanism can allow for faster monitoring in part since it may be done without use of a file system filter to monitor changes. Unfortunately, this replication mechanism may involve more resource overhead when comparing a prior copy of the file with an updated version. As such, both of these types of replication mechanism tend to be more effective with smaller files, or with large files that only have a set of the same bytes in a block of bytes that change frequently. Conversely, these replication mechanisms can be very inefficient for very large files, such as database files, particularly files that have sets of several bytes or byte blocks that change with relatively low frequency.

Another conventional replication mechanism involves identifying changes to files, rather than identifying only files that have changed. This mechanism of identifying changes to files typically relies on identifying files (e.g., names, types or locations) that are intended for replication, and identifying only the bytes that have changed in the file between administrator-defined time intervals in between replications. Thus, a backup agent (e.g., a "clone agent" in combination with a "file system filter" at the production server) logs only those changed bytes in the file, and ultimately communicates those changed bytes to the backup storage volume (i.e., "replica volume" on the storage medium). Unfortunately, this replication mechanism still tends to be more cost-effective from a resource expenditure standpoint for very large files or files that change infrequently between replication intervals, but less cost-effective for files that tend to change frequently or are entirely overwritten with each update.

Still another type of replication mechanism, which could be considered a hybrid in some respects of both of the above-discussed replication mechanisms, involves identifying files in terms of "byte blocks." Generally, "byte blocks" comprise fixed size contiguous blocks of bytes, of which there can be many in any given file. For example, a production server (or "file server") can identify files as sets of multiple blocks, where each block contains a plurality of bytes. If any of the bytes change within a given block (i.e., are updated, written to, etc.), the replication mechanism might flag the changed block, and send the entire block to the replica volume at an appropriate time. As such, the replica agent can spend only those resources that may be necessary to identify a changed block of bytes, rather than each changed byte in the file. This can allow a given server to avoid incurring additional overhead even though multiple changes may be made to the same byte block. Nevertheless, while this can provide the replication agent with some resource-expenditure advantages over the aforementioned mechanisms, this mechanism may still be better suited for larger files, such as database files, or files whose byte blocks are changed more than once within the same replication cycle.

Accordingly, an organization that is determining to use a particular replication mechanism for its backup service may need to weigh several considerations. Complicating this is the notion that, even though an organization may make a determination on its present file generation/change needs, such a consideration may nevertheless be inadequate in the future. For example, the organization's determination of a particular replication mechanism will typically be applied to all files to be protected, without regard to indicia that may make the determination more applicable for some files than for others, such as file type, size, location, or the like. Thus, the determination may be based on what the organization feels is best with its current environment, such as the set of most common file types, and/or commonly used applications.

Of course, if the predominant file type(s) and/or application types change(s) at a later point, then it is possible that the initially chosen replication mechanism may need to be replaced. This possibility can make it particularly difficult for the organization, both at the outset when trying to project what replication mechanism will be preferred, as well as at a later point from a resource expenditure perspective if or when needing to change. For example, the organization could insist that the bulk of applications used in the organization use a certain file type and/or application type that is suited to the chosen replication mechanisms, or alternatively commit itself to changing its replication mechanism periodically. Both of these scenarios, of course, can lead to significant cost and resource expenditure problems for the organization.

BRIEF SUMMARY

Implementations of the present invention solve one or more problems in the art with systems, methods, and computer program products configured to provide efficient determinations of appropriate replication mechanism for files in a production server. In particular, implementations of the present invention allow a determination to be made differently per file, per location, per file type, or per some other criterion, such that several different files on a production server could be backed up using different replication mechanisms. Furthermore, implementations of the present invention allow for such determinations to fluctuate automatically over time, to thereby ensure that the production server continues to use the most efficient replication mechanism for each file.

For example, a method in accordance with at least one implementation of the present invention from the perspective of a data protection manager server (i.e., backup server) for automatically determining an appropriate replication mechanism can involve identifying a plurality of files of a production server to be protected. The method can further involve identifying first replication information for a first set of one or more files in the plurality of files, as well as identifying second replication information for a second set of one or more files in the plurality of files. In addition, the method can involve assigning the first replication mechanism to the first set of files based on the first replication information.

Furthermore, the method can involve assigning the second replication mechanism to the second set of files based on the second replication information. As such, the first set of files and the second set of files are assigned in a way that they are to be replicated using different replication mechanisms. Upon making these assignments, the method can also involve sending the first replication mechanism assignment and the second replication assignment to a production server.

In addition, a method in accordance with an implementation of the present invention from the perspective of a production server (i.e., file server) for backing up file changes to the replica volume can involve identifying a plurality of files to be protected in a file system at the production server. The method can further involve receiving an indication that a first set of one or more files in the plurality of files is assigned to be replicated using a first replication mechanism. In addition, the method can involve receiving an indication that a second set of one or more files in the plurality of files is assigned to be replicated using a second replication mechanism. As such, the first set of one or more files and the second set of one or more files are assigned to be replicated using different replication mechanisms. In addition, the method can involve logging byte data of changes to files in the first set of files, as well as logging names of files that have changed in the second set of files.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to systems, methods, and computer program products configured to provide efficient determinations of appropriate replication mechanism for files in a production server. In particular, implementations of the present invention allow a determination to be made differently per file, per location, per file type, or per some other criterion, such that several different files on a production server could be backed up using different replication mechanisms. Furthermore, implementations of the present invention allow for such determinations to fluctuate automatically over time, to thereby ensure that the production server continues to use the most efficient replication mechanism for each file.

As will be appreciated more fully from the following specification and claims, data to be protected at a production server can be replicated on any of a plurality of different bases. In some cases, the administrator can input how a given set of files are to be replicated, while in other cases, the determinations can be made automatically (by a DPM server, or by a production server) based on some file use characteristics. For example, one result of backup administrator input, or of some automatic determination, might be to indicate that all database files (e.g., with a ".db" file extension) are to be replicated using an identification of changed bytes. Another result of a determination might be to indicate that all other files (e.g., those with a ".doc" extension, or those in a particular folder location) are backed up by replicating updated copies of the entire file. Still further, other sets of files can be set to be replicated based on determinations of their file size, location in the file system, and frequency of updates.

If the backup server made the determinations, then the backup server can then transmit this information to the production server. When the backup server requests the updates of each file, the production server can either send over copies of the changed file bytes, entire copies of the changed file itself, or even changed blocks of a file, as appropriate. As such, one will appreciate from the description herein that an organization can gain efficiency by automating selection and implementation of a wide variety of replication mechanisms with a variety of different files at a production server.

Figure 1A:
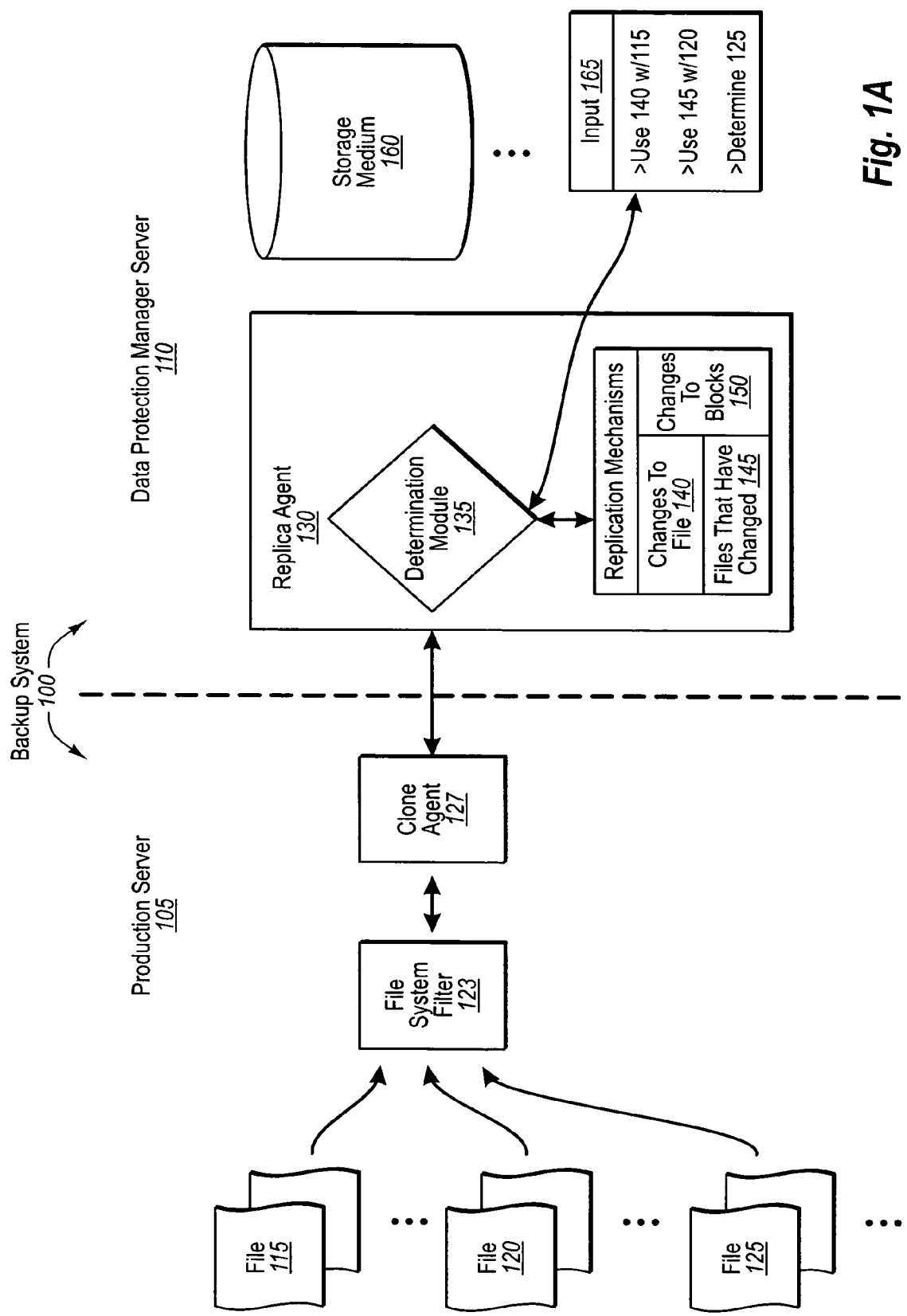
FIG. 1A illustrates an overview schematic diagram of an implementation of the present invention in which a data protection manager server determines and assigns a plurality of replication mechanisms to a plurality of files (or file sets) at a production server.

FIG. 1A illustrates a basic architectural overview of a backup system 100, which includes a backup server 110 (i.e., "Data Protection Manager Server 110", hereinafter "DPM server 110") configured to backup one or more production (or "file") servers (e.g., 105). To backup a production server, FIG. 1A shows that DPM server 110 comprises a replica agent 130. Generally, and as will be understood more fully from the following description, replica agent 130 comprises computer-executable code configured to determine appropriate replication policies for various files or file sets at production server 105, at least in part by determining which replications mechanisms (e.g., 140, 145, 150, etc.) to apply. The illustrated replication mechanisms 140, 145, and 150 are provided merely for illustration, and can include more or fewer replication mechanisms than those shown, depending on the operating environment, or as additional replication mechanisms are created.

In any event, of the illustrated replication mechanisms, replication mechanism 140 relates to "changes to file," which in this case means identification and replication of the particular bytes in a file that have changed. Replica agent 130 might select replication mechanism 140 for particularly large files, where it is more efficient to send only the changed raw bytes for the file over a network connection. Another of the replication mechanisms includes mechanism 145, which relates to "files that have changed." Generally, replication mechanism 145 refers to entire files (typically much smaller files, such as word processing files) that can be copied and sent in whole part to storage medium 160 when production server 105 determines that any portion of the file has changed. This can be done any number of ways, including sending an entire, updated file to storage medium 160, or by comparing the updated file to a backup copy of the file, and sending over only the changed bytes to storage medium 160. In both cases, specific bytes of the updated file are not logged in a log file when they are updated.

Still another of the illustrated replication mechanisms includes mechanism 150, which relates to "changes to blocks." Generally, each file can be thought of as a set of byte blocks. When any byte in a particular block has been updated, the production server can log the file name, as well as the byte block (i.e., typically this has a fixed size and consists of a collection of from 4096 to 16384 bytes) that has changed, and ultimately send that byte block to DPM server 110 when appropriate. Thus, replication mechanism 150 can be thought of as potentially replicating more data than otherwise might be sent with replication mechanism 140 (i.e., "changes to file") when the changes to a file are relatively infrequent on the same byte block. At the same time, replication mechanism 150 might be thought of as potentially less data than might otherwise be sent with replication mechanism 145 (i.e., "files that have changed"), unless sending only the changed bytes as described previously. One will appreciate therefore, that each described replication mechanism 140, 145, 150, can provide its own unique advantages, depending on file usage or system needs, and the way in which the replication mechanism is implemented.

In any event, replica agent 130 can associate various files at production server 105 with a particular replication mechanism, based on any number of automatic (static and/or dynamic) factors. For example, FIG. 1A illustrates that replica agent 130 can receive input 165, such as input received through a user interface presented to a backup administrator. As shown, input 165 includes static preferences such as those to use replication mechanism 140 with file (or file set) 115, and to use replication mechanism 145 with file (or file set) 120. In addition to these static preferences, input 165 further includes an input requesting an ongoing, automatic determination to be made regarding file (or file set) 125. For example, replica agent 130 can be configured to continually measure a given file's size or present location, as well as file type and file change activities, and then continually adjust whether to use replication mechanism 140, 145, or 150. Determination module 135 can then take any such received preferences, and, where lacking with other files (not shown), assign a replication mechanism based on some default configuration (e.g., "changes to file"). Determination module 135 can then communicate these preferences and assignments for each file to production server 105.

Accordingly, FIG. 1A shows that replica agent 130 interfaces with clone agent 127 at production server 105. Generally, clone agent 127 comprises computer-executable instructions configured to implement backup policies sent by DPM server 110. To implement these policies, clone agent 127 correlates the received replication mechanism assignments for the various files (e.g., 115, 120, 125) through a file system agent, such as file system filter 123. Generally, file system filter 123 also comprises computer-executable instructions configured at least to monitor file activities in the file system, and log writes, and/or mark updates, as described more fully below. Thus, for example, FIG. 1A shows that clone agent communicates with file system filter 123, which in turn interacts directly with the byte data of files (or file sets) 115, 120, and 125, and can monitor all changes to all files in the file system.

In particular, one will appreciate that file system filter 123 can be configured any number of ways to implement an assigned replication mechanism. In one particular implementation, for example, file system filter 123 continues to log (i.e., "capture") the data for each write to a special log file, such as files assigned to replication mechanism 140. File system filter 123 can then mark certain portions of other files, such as files assigned to replication mechanism 145 or 150, as dirty when updated. File system filter 123 can do this such as by marking that the particular file has changed, or that certain blocks of the file has changed. In addition, and rather than logging the actual changed data when using replication mechanisms 145 or 150, file system filter 123 can simply log the file names of the changed files, as well as the byte block addresses. When DPM server 110 requests updates from production server 110, clone agent 127 can send over the byte data in the log file, or send a copy of the file (or the changed file block(s)) identified by name in the log file.

Figure 1B:
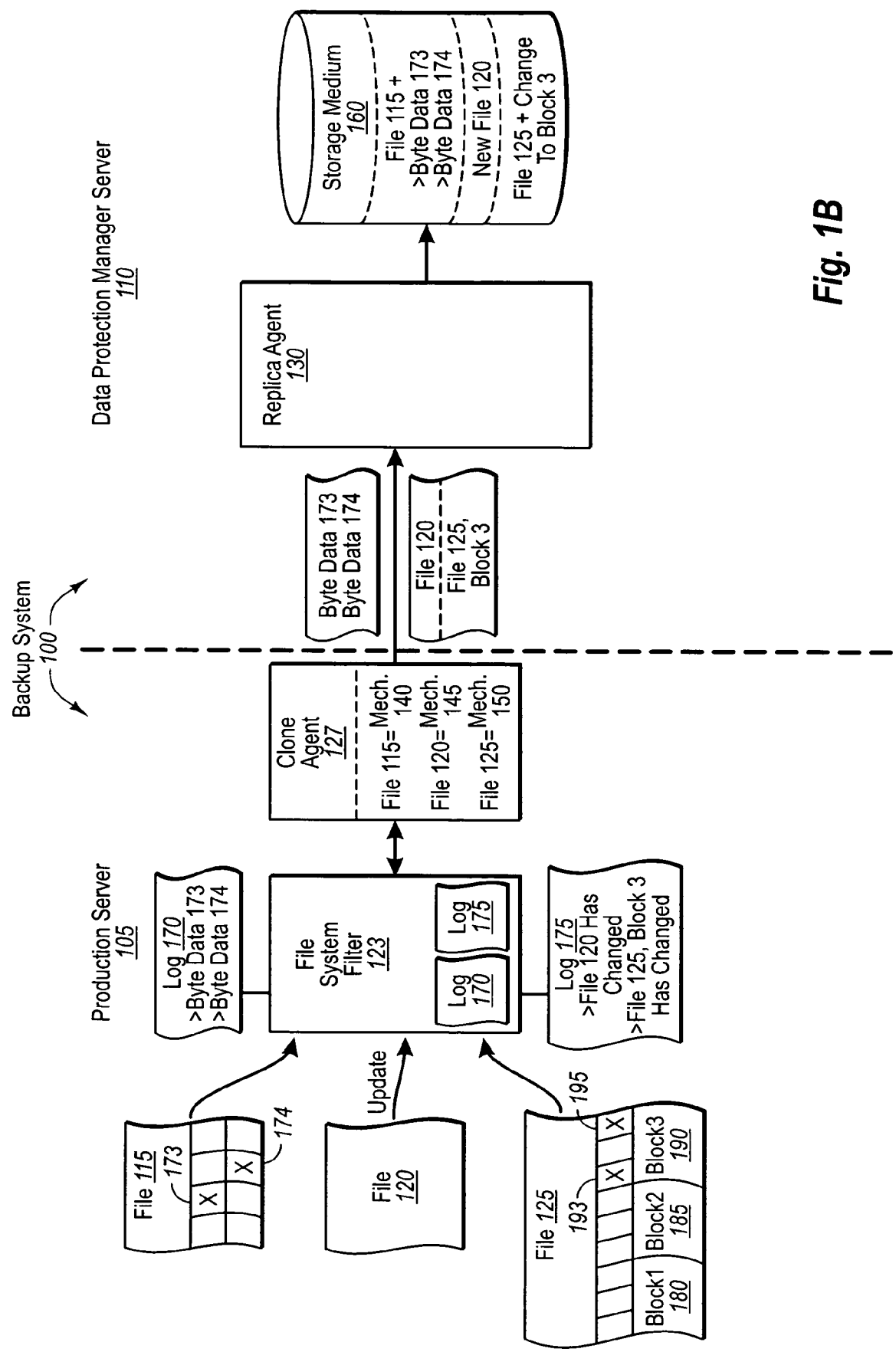
FIG. 1B illustrates the overview schematic diagram as shown in FIG. 1A, in which the production server implements a plurality of replication mechanisms.

For example, FIG. 1B illustrates one implementation of how clone agent 127 and file system filter 123 can implement the various replication mechanism instructions received from replica agent 130. In particular, FIG. 1B shows that clone agent 127 has associated file (or file set) 115 with replication mechanism 140 ("changes to file") in response to instructions received from DPM server 110. Clone agent 127 then directs file system filter 123 to monitor file 115 in accordance with the assigned replication mechanism. As such, FIG. 1B shows that, upon identifying that bytes 173 and 174 of file (or file set) 115 have changed, file system filter 123 retrieves and passes these data changes to log file 170.

FIG. 1B also shows that clone agent 127 has associated file (or file set) 120 with replication mechanism 145 (i.e., "files that have changed"), and further associated file (or file set) 125 with replication mechanism 150 in response to instructions received from DPM server 110. This means, in this case, that file system filter 123 will not necessarily record the actual raw, changed-byte data for file 120, but can simply record the name of file 120 in log file 175. Similarly, where bytes 193 and 195 of block 3 (of blocks 1, 2, and 3) in file 125 have changed, file system filter 123 can simply pass the file name and the address of the changed block(s) to log 175. Accordingly, FIG. 1B shows that log 175 comprises an indication (e.g., file name) that file 120 has changed, as well as an indication (e.g., file name and block address) that file 125 has changed, which indications are made in accordance with the respectively assigned replication mechanisms 145 and 150.

Accordingly, the illustrated implementation shows that file system filter 123 adds byte data to one log file (i.e., 170), but adds only the file names or block addresses in a different log file (i.e., 175). One will appreciate, however, that it is not necessary that various data changes be logged in separate files, or that the different log files be constructed using differing data change identification mechanisms. For example, file system filter 123 can log the changed bytes—as well as the file names and block addresses of changed files—in the same log file (e.g., 170 or 175), in accordance with implementations of the present invention. Similarly, file system filter 123 could also log byte addresses and files names in lieu of actual changed byte data; while, at the same time, file system filter 123 could log data for an entire file or for an entire block in a given log file (e.g., 170 and/or 175).

Nevertheless, and with respect to the illustrated implementation, clone agent 127 can simply forward log 170 containing the byte data to replica agent 130 when appropriate. With respect to log 175, clone agent 127 can first identify within log 175 whether a file or file block has changed. Upon so identifying, clone agent 127 can then copy the identified file or changed file blocks from their respective file system locations, and forward those changed files or file blocks to replica agent 130. In turn, replica agent 130 can then pass the data received from clone agent 127 to storage medium 160. As such, replica agent 130, clone agent 127, and file system filter 123 concertedly implement a different replication mechanism for each of files (or file sets) 115, 120, and 125.

As previously mentioned, these different assignments of replication mechanisms to one or more files or file sets can be done automatically. For example, file system filter 123 may, at some point, identify and pass along replication information to clone agent 127 and replica agent 130 that indicates that file 115 is shrinking to a much smaller size. Similarly, file system filter 123 might identify and pass along replication information to replica agent 130, which indicates that file 120 is dramatically increasing in both size and frequency of file updates. Replica agent 130 can be configured, in turn, to evaluate any received replication information, and reevaluate (not shown) a replication mechanism assignment for a given file or file set. Replica agent 130 can also be configured to prompt a backup administrator to provide new input regarding prior replication mechanism assignments based on new information.

Accordingly, replica agent 130 can be configured to reassign replication mechanisms for each of the files in production server 105, whether automatically in response to information received from clone agent 127, or in response to new input received periodically from a backup administrator. Furthermore, file and replication mechanism assignments can be easily adjusted as needed to thereby ensure the most efficient use of replication resources in system 100. In particular, implementations of the present invention can enhance efficiency of a backup system at least in part by allowing backups to occur with reduced consumption of network bandwidth, reduced amounts of local storage needed, and reduced local replication CPU overhead.

As such, FIGS. 1A-1B illustrate a number of components and schematics for implementing an automatically and dynamically adjustable backup system 100. In addition, one will appreciate that, although FIGS. 1A-1B —and much of the text herein—illustrates or describes determination module 135 primarily as a component resident on DPM server 110, this is simply one way of implementing aspects of the present invention. In particular, determination module 135 (or a similarly configured module) could reside on production server 105, or even on another server (not shown).

In such a case, DPM server 110 (or the like) might simply be configured to send instructions (e.g., administrator preferences) to the production server 105 regarding how to determine what replication mechanism to use (i.e., a default setting, some file behavior patterns, or the like). The production server 105 could then be configured to automatically determine and adjust what replication assignments are used for each given file (or file set) on its own, as opposed to the more passive role generally described herein. These general illustrations and descriptions, therefore, present only some of several possible implementations in accordance with the present invention for automatically determining one or more replication mechanisms for a given file (or file set) from multiple possible replication mechanisms.

Figure 2:
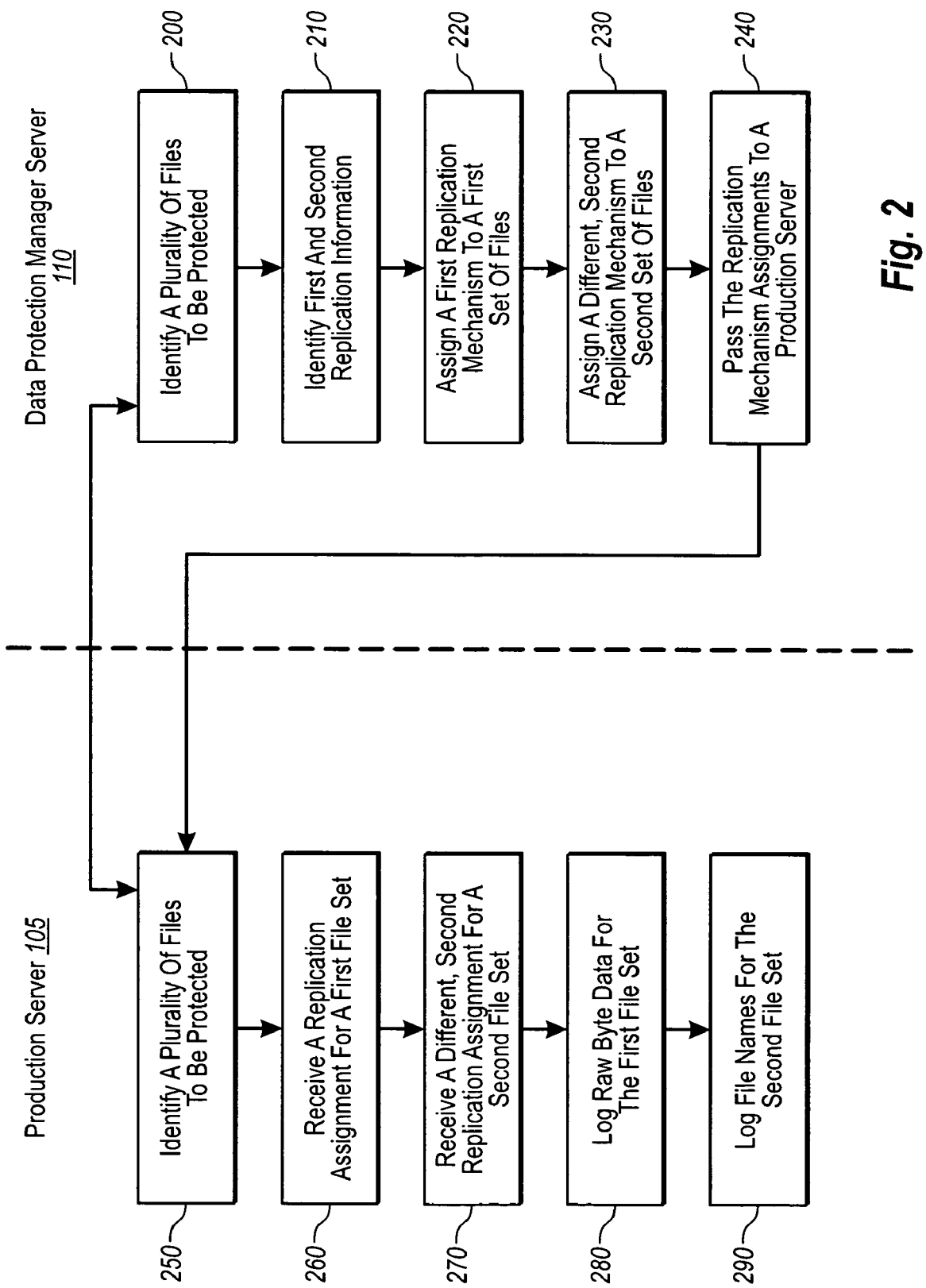
FIG. 2 illustrates a series of flowcharts from the perspective of a data protection manager server and of a production server for determining and implementing a plurality of replication mechanisms with a plurality of files at the production server, in accordance with an implementation of the present invention.

In addition to the foregoing overview schematic diagrams, implementations of the present invention can also be described in terms of methods comprising a sequence of one or more acts for accomplishing a particular result. In particular, FIG. 2 illustrates flowcharts from the perspective of production server 105 and of DPM server 110 for implementing a plurality of replication mechanisms for a plurality of files in a backup system. The acts of these flowcharts are described below with reference to the schematic diagrams of FIGS. 1A-1B.

As a preliminary matter, FIG. 2 and the corresponding claim text include some reference to "first" and/or "second" elements within acts of a method. It should be appreciated, however, that these designations are primarily to differentiate one element from another, and not necessarily to indicate any particular sequence of creation, assignment, or use. As such, the terms "first" or "second" interchangeable refer to the first and second time the relevant element is identified. Thus, for example, element 145 could be a "first replication mechanism" or a "second replication mechanism," and element 140 could also be a "first replication mechanism" or a "second replication mechanism" or even third replication mechanism, as appropriate.

In any event, FIG. 2 shows that a method from the perspective of DPM server 110 of automatically determining an appropriate replication mechanism for backing up a plurality of files comprises an act 200 of identifying a plurality of files to be protected. Act 200 includes identifying a plurality of files of a production server to be protected. For example, replica agent 130 receives information (not shown) identifying files, file types, folders, and/or file locations in file system filter 123 via clone agent 127. Similarly, DPM server 110 can receive input from the backup administrator identifying the common file types and/or application types at production server 105 and what replication mechanism may be best suited for each.

FIG. 2 further shows that the method from the perspective of DPM server 110 comprises an act 210 of identifying first and second replication information. Act 210 includes identifying first replication information for a first set of one or more files in the plurality of files, and second replication information for a second set of one or more files in the plurality of files. For example, FIG. 1A shows that replica agent 130 receives input 165 of static preferences, which indicate that replication mechanism 140 is to be used with file (or file set) 115, and that replication mechanism 145 is to be used with file (or file set) 120. Similarly, replica agent 130 receives an indication (or based on lack of an expected indication) to automatically determine a best replication mechanism for remaining files.

In addition, FIG. 2 shows that the method from the perspective of DPM server 110 comprises an act 220 of assigning a first replication mechanism to a first set of files. Act 220 includes assigning the first replication mechanism to the first set of files based on the first replication information. For example, determination module 135 takes any instructions of input 165, and/or identifies file information for file 115 sent along from production server 105, as well as any other file type, size, of write-frequency data. Determination module 135 then prepares these instructions indicating the replication mechanism (e.g., 140) is to be assigned to file (or file set) 115.

Similarly, FIG. 2 shows that the method from the perspective of DPM server 110 also comprises an act 230 of assigning a different, second replication mechanism to a second set of files. Act 230 includes assigning the second replication mechanism to the second set of files based on the second replication information, such that the first set of files and the second set of files are to be replicated using different replication mechanisms. For example, determination module 135 takes any instructions of input 165, and/or identifies file information for file 120 (or 125) sent along from production server 105, as well as any other file type, size, of write-frequency data. Determination module 135 then prepares these instructions indicating the replication mechanism 145 is to be assigned to file (or file set) (e.g., 120, or 125) to clone agent 127.

Accordingly, FIG. 2 shows that the method from the perspective of DPM server 110 comprises an act 240 of passing the replication mechanism assignments to a production server. Act 240 includes passing the first replication mechanism assignment and the second replication assignment to a production server. For example, DPM server 110 any determined replication mechanism and file assignments to production server 105; whereby clone agent 127 can store this information for reference by any relevant components (e.g., file system filter 123). Generally, once the data regarding these assignments are passed, production server 105 will begin protecting and logging changes for these files, i.e., files (or file sets) 115, 120, and 125 are now being protected and replicated.

FIG. 2 shows, therefore, that the method in accordance with an implementation of the present invention from the perspective of production server 105 of backing up file updates comprises an act 250 of identifying a plurality of files to be protected. Act 250 includes identifying a plurality of files to be protected in a file system. For example, file system filter 123 identifies files (or file sets) 115, 120, and 125, and/or their corresponding folders or file locations.

FIG. 2 further shows that the method from the perspective of production server 105 comprises an act 260 of receiving a replication assignment for a first file set. Act 260 includes receiving an indication that a first set of one or more files in the plurality of files is assigned to be replicated using a first replication mechanism. For example, clone agent 127 receives instructions from replica agent 130 that were determined via determination module 135, these instructions indicating that file 115 is to be replicated using replication mechanism 140 (i.e., "changes to files").

In addition, FIG. 2 shows that the method from the perspective of production server 105 comprises an act 270 of receiving a different, second replication assignment for a second file set. Act 270 includes receiving an indication that a second set of one or more files in the plurality of files is assigned to be replicated using a second replication mechanism, such that the first set of one or more files and the second set of one or more files are replicated using different replication mechanisms. For example, and as with act 260 described above, clone agent 127 receives instructions from replica agent 130 that were determined via determination module 135, the instructions indicating that file 120 is to be replicated using replication mechanism 145 (i.e., "changes to files"), and/or that file 125 is to be replicated using replication mechanism 150. Where file (or file set) 125 is associated with an automatically determined mechanism, this illustrates that not only can files be assigned to different replication mechanisms, but files can be assigned in different ways, such as by a form of input, or by automatic determinations by DPM server 110.

As such, FIG. 2 further shows that the method from the perspective of production server 105 comprises an act 280 of logging byte data for the first file set. Act 280 includes logging byte data of changes to files in the first set of files. For example, file system filter 123 identifies that bytes 173 and 174 have changed in file 115, and passes those raw bytes that were changed to log file 170.

FIG. 2 also shows that the method from the perspective of production server 105 comprises an act 290 of logging file names for the second file set. Act 290 includes logging names of files that have changed in the second set of files. For example, file system filter 123 identifies that any number of bytes in file 120 may have been updated, and/or that bytes 193 and 195 in block 3 of file 125 have been updated. In particular, file system filter 123 can calculate the differences in bytes between the source file (e.g., 125) and the destination (backup server-destination and protected file server-source) at replication time. Upon identifying the difference in bytes, file system filter 123, passes the file name for file 120, and/or passes the file name and changed block(s) for file 125, to log 175.

Accordingly, the schematics, components, and methods illustrated or described herein provide a number of mechanisms for ensuring that a DPM server (e.g., 110) can implement a variety of replication mechanisms in a way that is most efficient, and appropriately tailored for file usage at a production server. Thus, an organization can avoid committing to a particular replication mechanism at any given time. Furthermore, backup administrators can avoid the loss of resources that might otherwise be needed at a future point when updating or significantly changing from one replication mechanism scheme to another replication mechanism scheme.

One will appreciate, further, that the replication mechanisms described herein are simply exemplary types of replication mechanisms that can be considered by determination module 135 in accordance with implementations of the present invention. In particular, an organization may have many more replication mechanisms, and/or ways of replicating data updates, that it might desire to use at a production server. Implementations of the present invention are not limited to greater or fewer numbers than those replication mechanisms described herein, or to the particular time of replication mechanisms described herein. Rather, at least one advantage of implementations of the present invention is the ability to continually choose a most appropriate replication mechanism from what replication mechanisms are available in consideration of present or projected characteristics of files in a file system.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (e.g. via a hardwired connection) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a data protection manager server of a computerized environment in which a plurality of files in a file system of a production server are backed up to a storage medium volume using a plurality of replication mechanisms, a method of automatically determining an appropriate replication mechanism for backing up the plurality of files, comprising the acts of:

identifying a plurality of files of a production server to be protected;

identifying first replication information for a first set of one or more files in the plurality of files, wherein the first replication information includes one or more first file use characteristics for the first set of files, the first file use characteristics including at least one of file size, file type and file write frequency;

identifying second replication information for a second set of one or more files in the plurality of files, wherein the second replication information includes one or more second file use characteristics for the second set of files, the second file use characteristics including at least one of file size, file type and file write frequency;

automatically determining in a first determination that a first appropriate replication mechanism is to be applied to at least a portion of the first set of files based on the identified first replication information including the first file use characteristics, the first appropriate replication mechanism being configured to replicate at least a portion of the first set of files in a first appropriate manner, the first appropriate manner being the most efficient replication mechanism for archiving the first file set, wherein the first determination is further based on whether only the particular bytes in the first file set that have changed are to be archived, whether only the byte blocks of the first file set that have changed are to be archived, or whether the whole files of the first file set that have changed are to be archived, as part of the determined most efficient replication mechanism for the first set of files;

automatically determining in a second determination that a second, different appropriate replication mechanism to be applied to at least a portion of the second set of files based on the identified second replication information including the second file use characteristics, the second appropriate replication mechanism being configured to replicate at least a portion of the second set of files in a second, different appropriate manner, the second, different appropriate manner being the most efficient replication mechanism for archiving the second file set, wherein the second determination is further based on whether only the particular bytes in the second file set that have changed are to be archived, whether only the byte blocks of the second file set that have changed are to be archived, or whether the whole files of the second file set that have changed are to be archived, as part of the determined most efficient replication mechanism for the second set of files;

assigning the first replication mechanism to the first set of files based on the first determination;

assigning the second replication mechanism to the second set of files based on the second determination, such that the first set of files and the second set of files are to be replicated using different replication mechanisms in different manners according to the identified file characteristics; and sending the first replication mechanism assignment and the second replication assignment to the production server.

2. The method as recited in claim 1, wherein the first replication mechanism comprises instructions for identifying one or more changes in any of the first set of files, such that the production server is instructed to send raw data of each changed byte in the first set of files to a log file.

3. The method as recited in claim 1, wherein the second replication mechanism comprises instructions for identifying that a file of the second set of files has changed, such that the production server is instructed to perform at least one of the acts comprising:

sending the name of the file that has changed to a log file and at replication time sending the entire file contents to the data protection manager server; or sending the name of the file that has changed to a log file and at replication time requesting the differences in bytes between the file that has changed and a prior backup copy of the file that is backed up by the data protection manager server.

4. The method as recited in claim 3, wherein the second replication mechanism comprises instructions for identifying that one or more blocks of the file in the second set of files has changed, such that the name of the file and an identification of the changed blocks are sent to the log file.

5. The method as recited in claim 1, further comprising an act of receiving additional replication information related to any of the first or second sets of files at the production server.

6. The method as recited in claim 5, wherein the additional replication information includes information regarding any one or more of a change in file size, change in file type, change in file location, or change in frequency and size of data updates for the file of the first or second sets of files.

7. The method as recited in claim 6, further comprising an act of reassigning the second set of files with the first replication mechanism, such that the production server is instructed to log changed byte data of a changed file in the second set of files.

8. The method as recited in claim 6, further comprising an act of reassigning the first set of files with the second replication mechanism, such that the production server is instructed to log a file name, and not log changed byte data, of a changed file in the first set of files.

9. The method as recited in claim 8, wherein the production server is further instructed to log an identification of a block of changed bytes for the changed file in the first set of files.

10. At a production server of a computerized environment in which a plurality of files in a file system of the production server are backed up to a storage medium using a plurality of replication mechanisms, a method of backing up file updates to the storage medium in accordance with the plurality of replication mechanisms, comprising the acts of:
   identifying a plurality of files to be protected in a file system;
   receiving an indication that a first set of one or more files in the plurality of files is assigned to be replicated using a first replication mechanism, the first set of files including first replication information comprising one or more first file use characteristics for the first set of files, the first file use characteristics including at least one of file size, file type and file write frequency;
   receiving an indication that a second set of one or more files in the plurality of files is assigned to be replicated using a second replication mechanism, the second set of files including second replication information comprising one or more second file use characteristics for the second set of files, the second file use characteristics including at least one of file size, file type and file write frequency;
   automatically determining in a first determination that a first appropriate replication mechanism is to be applied to at least a portion of the first set of files based on the identified first replication information including the first file use characteristics, the first appropriate replication mechanism being configured to replicate at least a portion of the first set of files in a first appropriate manner, the first appropriate manner being the most efficient replication mechanism for archiving the first file set, wherein the first determination is further based on whether only the particular bytes in the first file set that have changed are to be archived, whether only the byte blocks of the first file set that have changed are to be archived, or whether the whole files of the first file set that have changed are to be archived, as part of the determined most efficient replication mechanism for the first set of files;
   automatically determining in a second determination that a second, different appropriate replication mechanism to be applied to at least a portion of the second set of files based on the identified second replication information including the second file use characteristics, the second appropriate replication mechanism being configured to replicate at least a portion of the second set of files in a second, different appropriate manner, the second, different appropriate manner being the most efficient replication mechanism for archiving the second file set, wherein the second determination is further based on whether only the particular bytes in the second file set that have changed are to be archived, whether only the byte blocks of the second file set that have changed are to be archived, or whether the whole files of the second file set that have changed are to be archived, as part of the determined most efficient replication mechanism for the second set of files;
   assigning the first replication mechanism to the first set of files based on the first determination;
   assigning the second replication mechanism to the second set of files based on the second determination, such that the first set of one or more files and the second set of one or more files are replicated using different replication mechanisms in different manners, according to the identified file characteristics;
   logging byte data of changes to files in the first set of files; and
   logging names of files that have changed in the second set of files.

11. The method as recited in claim 10, further comprising the acts of:
   logging the byte data of the first set of files into a first log file; and
   logging the names of files that have changed in the second set of files in a second log file that is different from the first log file.

12. The method as recited in claim 10, further comprising the acts of:
   sending the byte data of changes to files in the first set of files to a storage medium; and
   sending data updates to the storage medium for the second set of files, wherein the data updates correspond to one of:
   a copy of the contents of each file that has changed;
   byte differences between changed files and prior backup copies of the files; or
   file blocks of the files that have changed.

13. The method as recited in claim 10, further comprising the acts of:
   identifying a change in file size, change in file type, change in file location, or change in frequency of data updates for any file of the first or second sets of files;
   sending the identified change to a data protection manager server; and
   receiving a new replication mechanism assignment for any one or more of first or second sets of files.

14. The method as recited in claim 13, wherein the new replication mechanism assignment comprises an assignment of the first set of files with the second replication mechanism.

15. The method as recited in claim 14, further comprising the acts of:
   logging a file name and a changed block of bytes that have changed in a changed file of the first set of files; and
   upon request, sending to the data protection manager server data corresponding to the changed block of bytes in the changed file of the first set of files.

16. The method as recited in claim 14, further comprising the acts of:
   logging bytes that have changed in a changed file of the second set of files; and
   upon request, sending a log file of the logged bytes from the second set of files to the data protection manager server.

17. At a data protection manager server of a computerized environment in which a plurality of files in a file system of a production server are backed up to a storage volume using a plurality of replication mechanisms, a computer program product comprising one or more recordable-type computer-readable media having stored thereon computer-executable instructions stored thereon that, when executed, cause one or more processors at the data protection manager server to perform a method comprising the following:
   identifying a file of a production server that is to be protected;
   identifying first current replication information for the file, wherein the first current replication information includes one or more first file use characteristics for the file, the first file use characteristics including at least one of file size, file type and file write frequency;

automatically determining in a first determination that a first appropriate replication mechanism is to be applied to at least a portion of the first set of files based on the identified first replication information including the first file use characteristics, the first appropriate replication mechanism being configured to replicate at least a portion of the first set of files in a first appropriate manner, the first appropriate manner being the most efficient replication mechanism for archiving the first file set, wherein the first determination is further based on whether only the particular bytes in the first file set that have changed are to be archived, whether only the byte blocks of the first file set that have changed are to be archived, or whether the whole files of the first file set that have changed are to be archived, as part of the determined most efficient replication mechanism for the first set of files, the first determination being automatically performed on a continual basis, such that the most efficient replication mechanism is continually used to back up the file;

automatically assigning the first appropriate replication mechanism to the file based on the first determination of the continual determinations;

sending the first replication mechanism assignment to the production server;

receiving an indication that one or more of the file's use characteristics has changed and that the first appropriate replication mechanism is no longer the most efficient replication mechanism for replicating the first set of files;

identifying second current replication information for the file, wherein the second current replication information includes one or more second updated file use characteristics for the file, the second file use characteristics including at least one of file size, file type and file write frequency;

automatically reevaluating in a second determination a second appropriate replication mechanism that is to be applied to at least a portion of the file based on the updated file use characteristics, the second appropriate replication mechanism being configured to replicate at least a portion of the second set of files in a second, different appropriate manner, the second, different appropriate manner being the most efficient replication mechanism for archiving the second file set, wherein the second determination is further based on whether only the particular bytes in the second file set that have changed are to be archived, whether only the byte blocks of the second file set that have changed are to be archived, or whether the whole files of the second file set that have changed are to be archived, as part of the determined most efficient replication mechanism for the second set of files, the determination being automatically performed on a continual basis, such that the most efficient replication mechanism is continually used to back up the file;

automatically assigning the second appropriate replication mechanism to the file based on the second determination of the continual determinations;

sending the second replication mechanism assignment to the production server.

18. The method of claim 1, wherein the file characteristics include at least one of file type and file location.

19. The method of claim 1, wherein the at least one of the first determination and the second determination is determined in consideration of projected file characteristics.

20. The computer program product of claim 17, further comprising prompting a backup user to provide new input regarding prior replication mechanism assignments based on the received indication.

* * * * *

UNITED STATES PATENT AND TRADEMARK OFFICE
CERTIFICATE OF CORRECTION

| | | |
|---|---|---|
| PATENT NO. | : 7,698,318 B2 | Page 1 of 1 |
| APPLICATION NO. | : 11/351547 | |
| DATED | : April 13, 2010 | |
| INVENTOR(S) | : Robert M. Fries et al. | |

It is certified that error appears in the above-identified patent and that said Letters Patent is hereby corrected as shown below:

In column 6, line 17, after "agent" insert -- 127 --.

Signed and Sealed this
Twenty-fifth Day of January, 2011

David J. Kappos
*Director of the United States Patent and Trademark Office*